(12) United States Patent
Chang

(10) Patent No.: US 8,218,103 B2
(45) Date of Patent: Jul. 10, 2012

(54) DISPLAY DEVICE HAVING SCANNING FUNCTION WITH CAMERA MODULES

(75) Inventor: Jen-Tsorng Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 378 days.

(21) Appl. No.: 12/639,131

(22) Filed: Dec. 16, 2009

(65) Prior Publication Data
US 2010/0309325 A1 Dec. 9, 2010

(30) Foreign Application Priority Data
Jun. 3, 2009 (CN) .......................... 2009 1 0302894

(51) Int. Cl.
G02F 1/1333 (2006.01)
F21V 7/04 (2006.01)
H04N 5/77 (2006.01)

(52) U.S. Cl. .............. 349/58; 349/2; 362/632; 362/633; 362/634; 386/359; 386/360; 386/362

(58) Field of Classification Search .................. 349/58, 349/2; 362/632–634; 386/359–362
See application file for complete search history.

(56) References Cited

U.S. PATENT DOCUMENTS

| | | | | |
|---|---|---|---|---|
| 7,898,585 B2 * | 3/2011 | Nam | .............................. | 348/302 |
| 2004/0201987 A1 * | 10/2004 | Omata | .......................... | 362/230 |
| 2005/0179731 A1 * | 8/2005 | Omura et al. | .................... | 347/50 |
| 2007/0205357 A1 * | 9/2007 | Tanaka et al. | ............. | 250/227.14 |
| 2008/0232762 A1 * | 9/2008 | Kuramoto et al. | ............ | 385/145 |

* cited by examiner

Primary Examiner — Hoan C Nguyen
(74) Attorney, Agent, or Firm — Altis Law Group, Inc.

(57) ABSTRACT

A display device includes a housing, a liquid crystal panel member, numerous camera modules, a light emitting device and a processing unit. The housing defines a slot configured for allowing an display medium to enter the display device. The liquid crystal panel member is received in the housing. The camera modules are positioned in the reflective housing and each is configured for capturing a sub-images of a corresponding portion of the display medium. The light emitting device is configured for emitting light to the display medium. The processing unit is configured for obtaining an image of the display medium by synthesizing the sub-images of the corresponding portions of the display medium.

12 Claims, 3 Drawing Sheets

DISPLAY DEVICE HAVING SCANNING FUNCTION WITH CAMERA MODULES

BACKGROUND

1. Technical Field

The present disclosure relates to display technologies, and particularly, to display devices having a scanning function.

2. Description of Related Art

Display devices are used widely to display images, texts, etc. One kind of the display devices is a digital frame. The images displayed by the digital frame are in a digital form. Therefore, typical photos obtained by developing films have to be scanned to convert into a digital form. However, a scanner and the digital frame generally are two individual devices. It is inconvenient when scanning.

Therefore, a display device having a scanning function, which can overcome the described shortcomings, is desirable.

DETAILED DESCRIPTION

Figure 1:
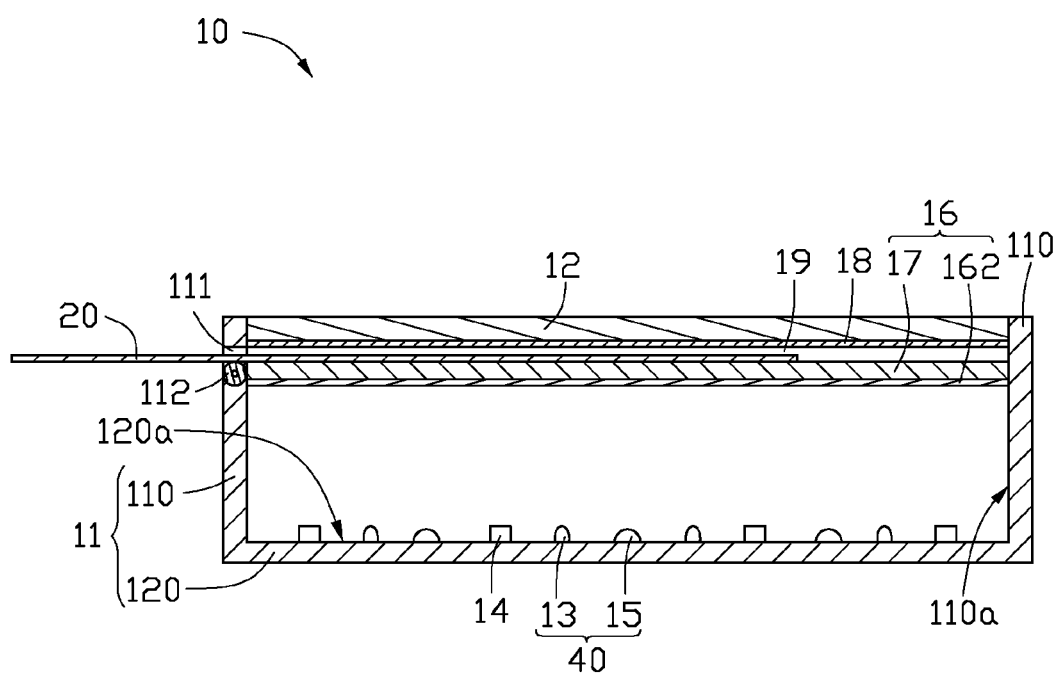
FIG. 1 is a cross-section view of a display device including an infrared light reflective member, according to an exemplary embodiment.
Figure 2:
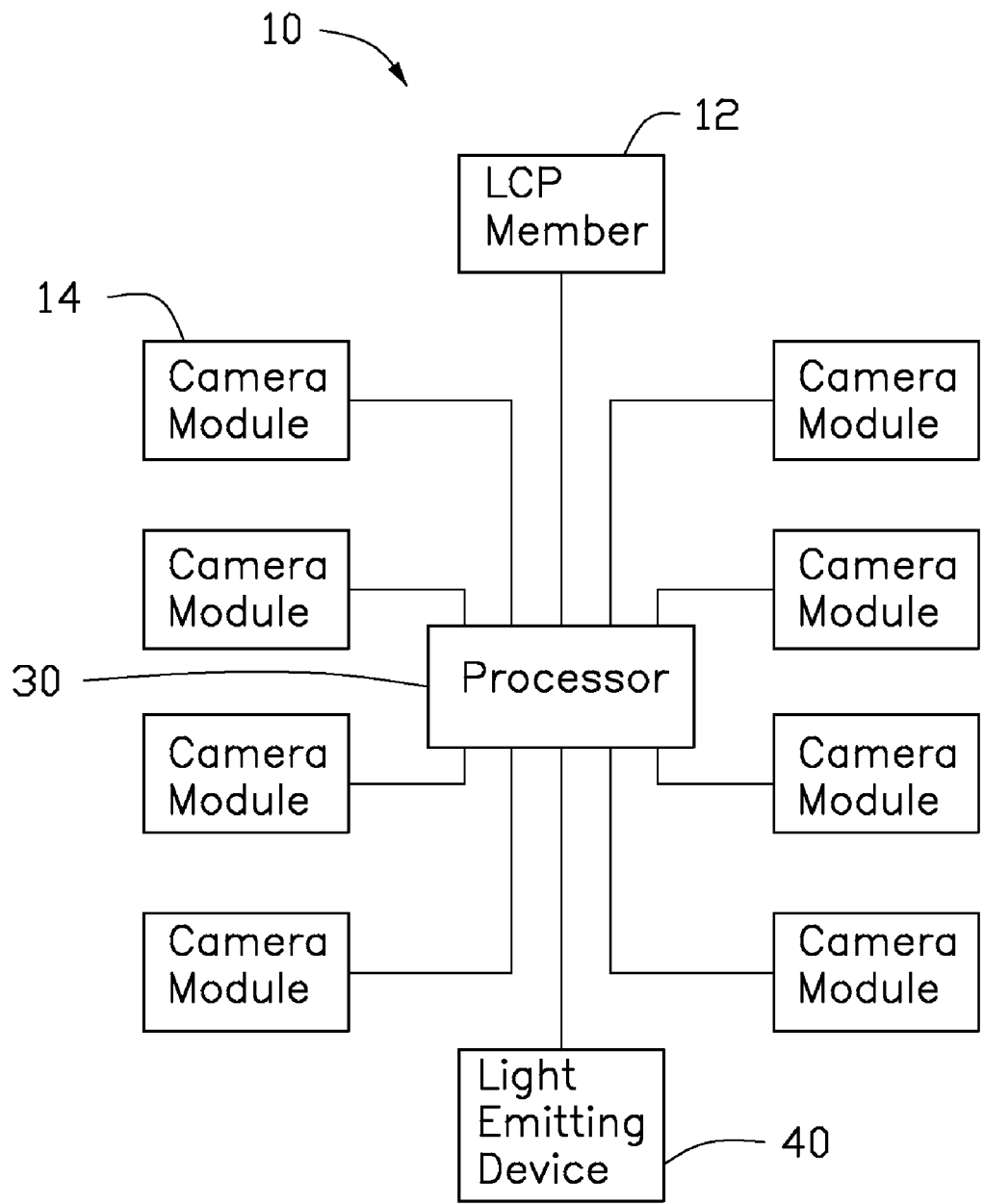
FIG. 2 is a partial functional block diagram of the display device of FIG. 1.

Referring to FIGS. 1 and 2, a display device 10, according to an exemplary embodiment, includes a reflective housing 11, a liquid crystal panel (LCP) member 12, a light emitting device 40, a plurality of camera modules 14, a diffusing plate 18 and a processing unit.

The reflective housing 11 is substantially cuboid-shaped and includes a bottom plate 120 and four side plates 110 extending substantially perpendicularly from four edges of the bottom plate 120 (only two side plates 110 are illustrated in FIG. 1). Inner surfaces 110a of the side plates 110 and an inner surface 120a of the bottom plate 120 are coated with light reflective layers for enhancing a light utilization ratio. The inner surfaces 110a, 120a serve as a light-reflective inner surface of the housing 11. The LCP member 12 is received in the reflective housing 11 and fixed to the four side plates 110. A slot 111 is defined in the side plate 110 and is configure for allowing an display medium 20 to enter an inside of the housing 11 and scanned. A roller 112 adjacent to the slot 111 is arranged in the side plate 110 to for facilitating movement of the display medium 20 into the inside of the housing 11. The roller 112 can be driven by a motor (not shown). The display medium 20 may be a photo obtained by developing a film or a printed file.

The LCP member 12 is a transmissive-type liquid crystal display.

The diffusing plate 18 is positioned on the LCP member 12 facing the light emitting device 40. The diffusing plate 18 is configured for diffusing light to provide a surface light source.

The light emitting device 40 includes a plurality of visible-light light sources 13 and a plurality of infrared light sources 15.

The visible-light light sources 13, the camera modules 14 and the infrared light sources 15 are positioned on the inner surface 120a of the bottom plate 120.

The visible-light light sources 13 emit visible light toward the diffusing plate 18. The visible-light light sources 13 are light emitting diodes (LEDs) or cold cathode fluorescent lamp. When the display device 10 is not used for scanning, the visible-light light sources 13 and the diffusing plate 18 can be used as a backlight module for the LCP member 12. The infrared light sources 15 are infrared LEDs.

In this embodiment, the camera modules 14 are arranged in a 4×2 array. The camera module 14 is configured for capturing a sub-image of a corresponding portion of the display medium 20.

The processing unit is configured for obtaining an image of the display medium 20 by combining the sub-images of the corresponding portions of the display medium 20. The processing unit includes an infrared light reflective member 16 and a processor 30.

Figure 3:
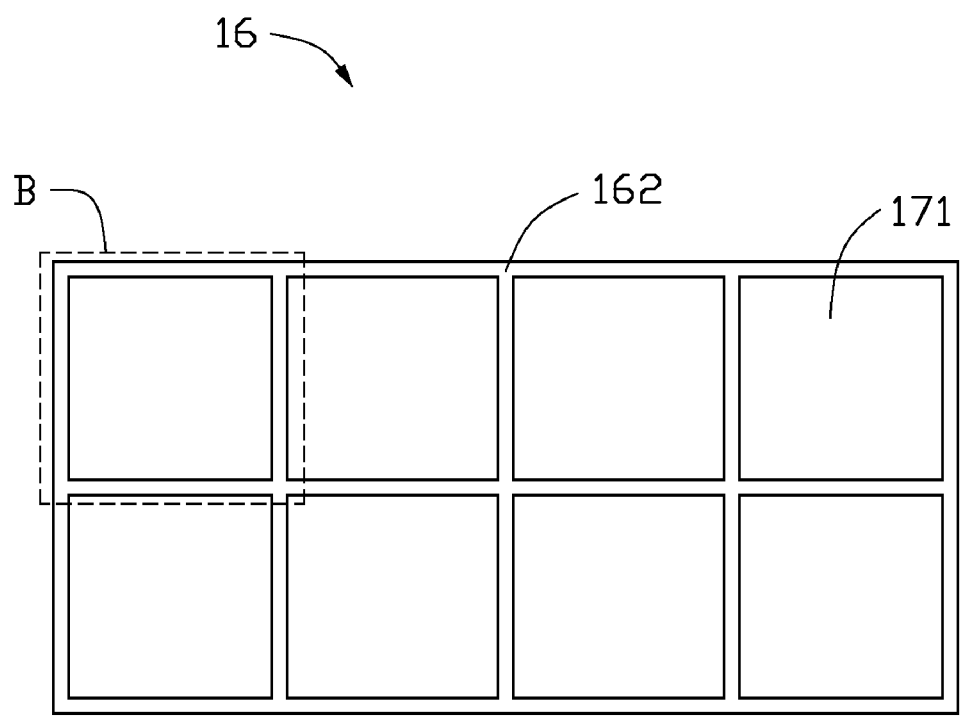
FIG. 3 is a bottom view of the infrared light reflective member of FIG. 1.

The infrared light reflective member 16 is received in the reflective housing 11 and positioned between the bottom plate 120 and the diffusing plate 18 facing the light emitting device 40 and the camera modules 14. The infrared light reflective member 16 includes a transparent plate 17 and an infrared light reflective pattern 162. The transparent plate 17 is spaced from the diffusing plate 18. An air gap 19 is formed accordingly. The air gap 19 is in communication with the slot 111 to receive the display medium 20 from the slot 111. The infrared light reflective pattern 162 is formed on a surface of the transparent plate 17 facing the light emitting device 40. The infrared light reflective pattern 162 includes eight grids arranged in a 4×2 array. Eight exposed areas 171 of the transparent plate 17 are formed in a 4×2 array by the eight grids of the infrared light reflective pattern 162 accordingly (see FIG. 3). Each exposed area 171 is substantially a square. The transparent plate 17 is a glass plate or a plastic plate. The infrared light reflective pattern 162 reflects infrared light but allows visible light through. The infrared light reflective pattern 162 can be formed on the transparent plate 17 by a sputter-coating process or a vapor-deposition process with a pattern mask.

Each camera module 14 is aligned with a center of a corresponding exposed area 171. A capturing area B of the camera module 14 is larger than an area of the grid of the infrared light reflective pattern 162. The camera module 14 may include a lens module and an image sensor.

The processor 30 is electrically connected to the camera modules 14 and is configured for combining the sub-images into the image of the display medium 20. In detail, when scanning the display medium 20 received in the air gap 19, each camera module 14 captures the sub-image of the corresponding portion of the display medium 20. The processor 30 obtains the image of the display medium 20 by synthesizing the eight sub-images of the corresponding portions of the display medium 20. The synthesizing of the sub-images of the corresponding portion of the display medium 20 follows.

Before scanning the display medium 20, the infrared light sources 15 are activated to irradiate the infrared light reflective member 16. The infrared light reflective pattern 162 reflects the infrared light. The camera modules 14 capture eight infrared sub-images each including an infrared highlighting frame. The processor 30 obtains the eight infrared sub-images from eight camera modules 14.

After the infrared sub-images are obtained, the infrared light sources 15 are inactivated and the visible-light light sources 13 are activated. The display medium 20 is illuminated by the visible-light light sources 13 and the camera modules 14 capture the eight sub-images of eight corresponding portions of the display medium 20. The infrared sub-image and the sub-image of the corresponding portion of the display medium 20 captured by a same camera module 14 are compared with each other to determine an area of the sub-image of the corresponding portion of the display medium 20 coinciding with an area of the infrared sub-image framed by the infrared highlighting frame. Thus, eight determined areas of the sub-images of the corresponding portions of the display medium 20 are obtained. Then, the eight determined areas of the sub-images are combined to form the image of the display medium 20. The image of the display medium 20 can be stored in the display device 10 and displayed on the LCP member 12. Activation and inactivation of the visible-light light sources 13 and the infrared light sources 15 of the light emitting device 40 may be controlled by the processor 30.

Because the display device 10 has a scanning function, it is convenient for scanning information on a display medium. Furthermore, because the visible-light light sources 13 function as a back light for the LCP member 12 and an illuminator for scanning the display medium 20, no additional light sources are needed for illuminating the display medium 20. As a result, the display device having the scanning function is compact.

It is to be understood that number of the camera module 14 is equal to that of the grid of the infrared light reflective pattern 162. The number of the camera module 14 may differ in other alternative embodiments.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display device, comprising:
   a reflective housing defining a slot configured for allowing a display medium to enter an inside of the reflective housing;
   a liquid crystal panel member received in the relective housing;
   a plurality of camera modules positioned in the reflective housing and each configured for capturing a sub-image of a corresponding portion of the display medium;
   a light emitting device configured for emitting light to the display medium; and
   a processing unit configured for obtaining an image of the display medium by combining the sub-images of the corresponding portions of the display medium.

2. The display device of claim 1, wherein the reflective housing includes a light-reflective inner surface.

3. The display device of claim 1, wherein the reflective housing comprises a bottom plate and a plurality of side plates extending substantially perpendicularly from the bottom plate, the liquid crystal panel member fixed to the side plates, the light emitting device and the camera modules positioned on an inner surface of the bottom plate.

4. The display device of claim 3, wherein the slot is defined in the side plate.

5. The display device of claim 4, further comprising a roller adjacent to the slot and arranged in the side plate for facilitating movement of the display medium into the inside of the reflective housing.

6. The display device of claim 3, further comprising a diffusing plate positioned on the liquid crystal panel member facing the light emitting device.

7. The display device of claim 6, wherein the light emitting device comprises a plurality of visible-light light sources and a plurality of infrared light sources positioned on the inner surface of the bottom plate.

8. The display device of claim 7, wherein the processing unit comprises an infrared light reflective member and a processor, the infrared light reflective member positioned between the bottom plates and the diffusing plate, and the processor electrically connected to the camera modules and configured for combining the sub-images into the image of the display medium.

9. The display device of claim 8, wherein the infrared light reflective member comprises a transparent plate and an infrared light reflective pattern formed on the transparent plate.

10. The display device of claim 9, wherein an air gap is formed between the diffusing plate and the transparent plate; the air gap is in communication with the slot to receive the display medium from the slot.

11. The display device of claim 9, wherein the infrared light reflective pattern comprises a plurality of grids, each grid spatially corresponding to one camera module.

12. The display device of claim 11, wherein a capturing area of each camera module is larger than an area of the corresponding grid.

* * * * *